US008390658B2

(12) United States Patent
Arai

(10) Patent No.: US 8,390,658 B2
(45) Date of Patent: Mar. 5, 2013

(54) PRINTING APPARATUS AND A PRINTING SYSTEM

(75) Inventor: Tomomi Arai, Aichi (JP)

(73) Assignee: Brother Kogyo Kabushiki Kaisha, Nagota-shi, Aichi-ken (JP)

( * ) Notice: Subject to any disclaimer, the term of this patent is extended or adjusted under 35 U.S.C. 154(b) by 219 days.

(21) Appl. No.: 12/986,216

(22) Filed: Jan. 7, 2011

(65) Prior Publication Data

US 2011/0242151 A1 Oct. 6, 2011

(30) Foreign Application Priority Data

Mar. 30, 2010 (JP) ................................ 2010-078890

(51) Int. Cl.
*G01D 15/06* (2006.01)
*B41J 2/385* (2006.01)

(52) U.S. Cl. ......... 347/164; 347/117; 347/134; 347/153

(58) Field of Classification Search .................. 347/117, 347/134, 153, 164
See application file for complete search history.

(56) References Cited

U.S. PATENT DOCUMENTS

| | | | |
|---|---|---|---|
| 5,534,974 | A | 7/1996 | Hasegawa |
| 6,195,170 | B1 | 2/2001 | Mizutani et al. |
| 2008/0068639 | A1 | 3/2008 | Satoh et al. |
| 2009/0303530 | A1 | 12/2009 | Honma et al. |
| 2010/0021188 | A1 | 1/2010 | Mizumukai |

FOREIGN PATENT DOCUMENTS

| | | |
|---|---|---|
| JP | 07-121331 | 5/1995 |
| JP | 07-250190 | 9/1995 |
| JP | 07-299936 | 11/1995 |
| JP | 07299936 A * | 11/1995 |
| JP | 10-341308 | 12/1998 |
| JP | 11-032139 | 2/1999 |
| JP | 2001-343872 | 12/2001 |
| JP | 2002-127570 | 5/2002 |
| JP | 2002-154691 | 5/2002 |
| JP | 2002-207399 | 7/2002 |
| JP | 2004-002046 | 1/2004 |
| JP | 2004-021049 | 1/2004 |

(Continued)

OTHER PUBLICATIONS

Notification of Reasons for Rejection for corresponding Japanese Patent Application No. 2010-094064 mailed Feb. 28, 2012.

(Continued)

*Primary Examiner* — Stephen Meier
*Assistant Examiner* — Sarah Al Hashimi
(74) *Attorney, Agent, or Firm* — Banner & Witcoff, Ltd

(57) ABSTRACT

A printing apparatus is provided. The printing apparatus includes an image forming unit to form an image on a sheet in a colorant, a first sheet feeder and a second sheet feeder to supply sheets to the image forming unit, a trial printing system, which conducts a trial printing process to print at least a part of images included in a print job on a sheet supplied from the second sheet feeder when the print job designates the first sheet feeder, a first receiving system, which receives an instruction to continue printing after completion of the trial printing process, and a main printing system, which conducts a main printing process to print the images included in the print job on a sheet supplied from the first sheet feeder when the first receiving system receives the instruction to continue printing.

9 Claims, 8 Drawing Sheets

FOREIGN PATENT DOCUMENTS

| | | |
|---|---|---|
| JP | 2005-037918 | 2/2005 |
| JP | 2005-094524 | 4/2005 |
| JP | 2005-254822 | 9/2005 |
| JP | 2005-262640 | 9/2005 |
| JP | 2005-306043 | 11/2005 |
| JP | 2006-035809 | 2/2006 |
| JP | 2006-298652 | 11/2006 |
| JP | 2007-243388 | 9/2007 |
| JP | 2007-320150 | 12/2007 |
| JP | 2008-102470 | 5/2008 |
| JP | 2009-020284 | 1/2009 |
| JP | 2009-296212 | 12/2009 |
| JP | 2010-009244 | 1/2010 |
| JP | 2010-032705 | 2/2010 |
| JP | 2010-086555 | 4/2010 |

OTHER PUBLICATIONS

Notification of Reasons for Rejection for corresponding Japanese Application No. 2010-094064 mailed Jul. 31, 2012.

Notification of Reasons for Rejection for corresponding Japanese Patent Application No. 2010-078890 mailed Dec. 20, 2011.

* cited by examiner

PRINTING APPARATUS AND A PRINTING SYSTEM

CROSS REFERENCE TO RELATED APPLICATION

This application claims priority from Japanese Patent Application No. 2010-078890, filed on Mar. 30, 2010, the entire subject matter of which is incorporated herein by reference.

BACKGROUND

1. Technical Field

An aspect of the present invention relates to a printing apparatus and a printing system.

2. Related Art

Electric devices may be subject to various operational troubles, and a printing apparatus (e.g., a copier) may not always generate correctly printed images. For example, when the copier is not equipped with substantial amount of colorants, an unintended incomplete image may be formed. A user of the printing apparatus is often unaware of such insufficient condition of the printing apparatus and notes the troubles for the first time when the user views the printed image on a recording sheet, i.e., after completion of such troubled printing operations. In order to deal with such troubles, for example, a facsimile machine which reserves print data even after completion of a printing operation is suggested. The facsimile machine can examine past printing behaviors of itself and reserve the print data if the past behaviors indicate possibility of troubles so that the reserved print data is used once again when the trouble is cleared.

SUMMARY

In the above-mentioned printing apparatus, however, the recording sheet once used in the troubled printing operation is occupied by the incomplete image and not reusable. Therefore, in many cases, the misprinted recording sheets are discarded to be wasted. Specifically, waste of fine-quality recording sheets or recording sheets of special materials may cause greater loss.

In view of the above inconvenience, the present invention is advantageous in providing a printing apparatus and a printing system, which can prevent the recording sheets from being unnecessarily wasted.

According to an aspect of the present invention, a printing apparatus is provided. The printing apparatus includes an image forming unit to form an image on a sheet in a colorant, a first sheet feeder and a second sheet feeder to supply sheets to the image forming unit, a trial printing system, which conducts a trial printing process to print at least a part of images included in a print job on a sheet supplied from the second sheet feeder when the print job designates the first sheet feeder, a first receiving system, which receives an instruction to continue printing after completion of the trial printing process, and a main printing system, which conducts a main printing process to print the images included in the print job on a sheet supplied from the first sheet feeder when the first receiving system receives the instruction to continue printing.

According to another aspect of the present invention, a printing system is provided. The printing system includes an image forming unit to form an image on a sheet in a colorant, a first sheet feeder and a second sheet feeder to supply sheets to the image forming unit, a trial printing system, which conducts a trial printing process to print at least a part of images included in a print job on a sheet supplied from the second sheet feeder when the print job designates the first sheet feeder, a receiving system, which receives an instruction to continue printing after completion of the trial printing process, and a main printing system, which conducts a main printing process to print the images included in the print job on a sheet supplied from the first sheet feeder when the receiving system receives the instruction to continue printing.

BRIEF DESCRIPTION OF THE ACCOMPANYING DRAWINGS

DETAILED DESCRIPTION

Hereinafter, an embodiment of the present invention will be described with reference to the accompanying drawings. The MFP 100 is a multifunction peripheral device equipped with a plurality of functions including a printing function, a facsimile transmission function, and a scanning function.

Overall Configuration of the MFP

Figure 1:
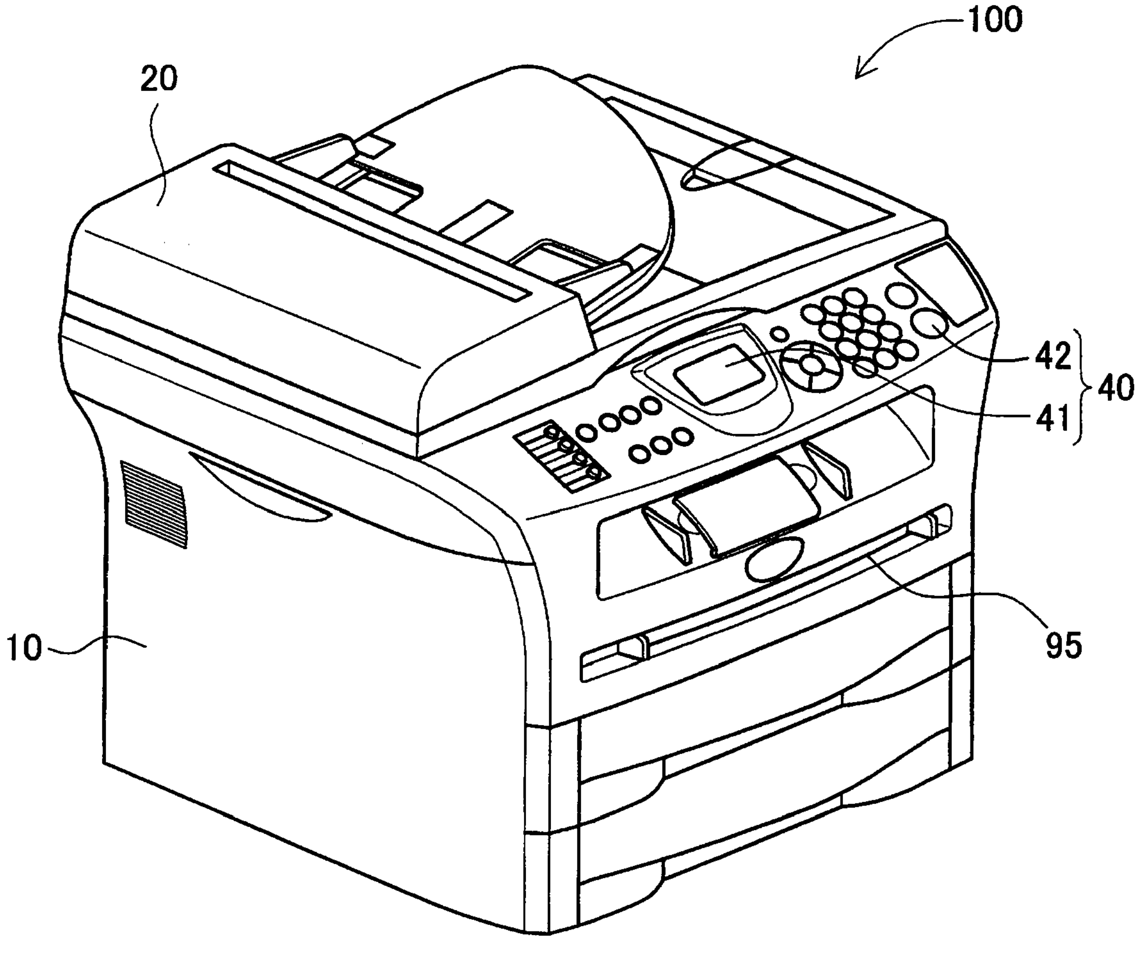
FIG. 1 is a perspective view of an MFP (multifunction peripheral) according to an embodiment of the present invention.

The MFP 100 (see FIG. 1) according to the present embodiment includes an image forming unit 10, which forms an image on a recording sheet, and an image reading unit 20, which reads an image formed on a sheet. The MFP 100 is provided with a manual-feed inlet 95, through which manually set recording sheets are fed to the MFP 100. The MFP 100 has an operation panel 40, through which information concerning operations of the MFP 100 is displayed and user's input is entered, on an upper front of the image reading unit 20. The operation panel 40 includes a display unit 41 being a liquid crystal display and buttons 42 including a start key, a stop key, and numerical keys (not shown).

Configuration of the Image Forming Unit in Detail

The image forming unit 10 (see FIG. 2) includes a processing unit 50, a fixing unit 8, sheet cassettes 91A, 91B, and a discharge tray 92. The processing unit 50 develops toner images and transfers the toner images onto the sheet being conveyed. The fixing unit 8 fixes the toner transferred to the sheet thereto. The sheet cassettes 91A, 91B are containers to store unused new sheets in stacks. The discharge tray 92 is a tray, in which ejected sheets with images printed thereon are settled. The image reading unit 20 is arranged on an upper position with respect to the image forming unit 10.

The conveyer belt 7 is an en endless belt made of resin such as polycarbonate. The conveyer belt 7 extends to roll around conveyer rollers 73, 74. When the conveyer roller 74 rotates in a counterclockwise direction (in FIG. 2), the conveyer belt 7 rolls accordingly to convey the recording sheet to pass by the processors 50Y, 50M, 50C, 50K.

Figure 2:
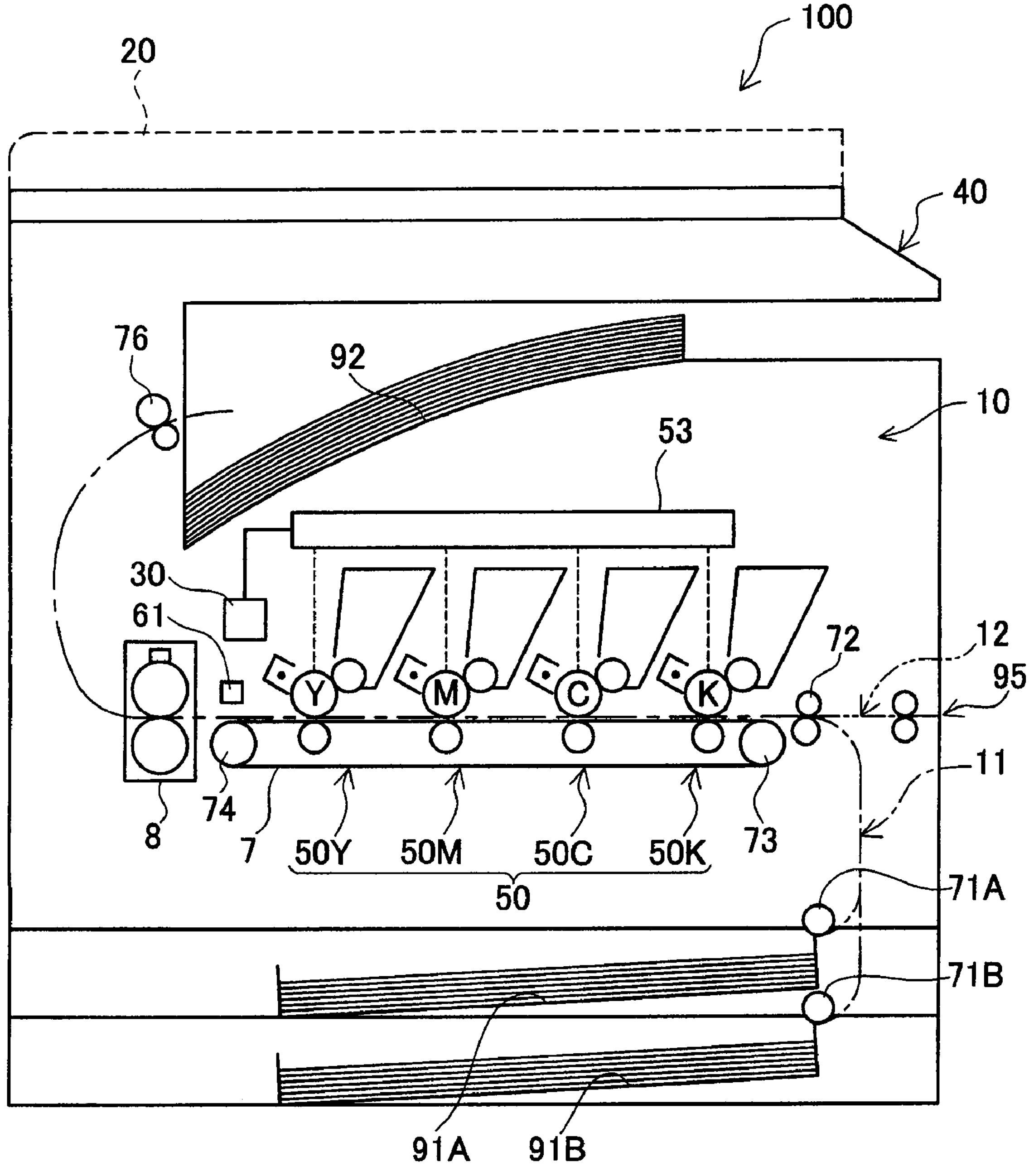
FIG. 2 is a schematic diagram to illustrate an internal configuration of the MFP according to the embodiment of the present invention.

The image forming unit 10 includes a feeding path 11, in which the sheets picked up from the sheet cassettes 91A, 91B by feed rollers 71A, 71B are conveyed to pass through a register roller 72, the processing unit 50, the fixing unit 8, and a discharge roller 76. The sheet conveyed in the feeding path 11 is ejected and directed to settle in the discharge ray. In FIG. 2, the feeding path 11 is indicated by a dotted line winding in a form of an S. Further, the image forming unit 10 includes a linear feeding path 12, which is indicated by double-dotted line in FIG. 2. Recording sheets can be fed in the linear feeding path 12 to be conveyed to the image forming unit 10 through the manual-feed inlet 95.

The processing unit 50 includes four (4) processors 50Y, 50M, 50C, 50K aligned in line, which enable image forming in colors. In particular, the processor 50Y forms an image in yellow, the processor 50M forms an image in magenta, the processor 50C forms an image in cyan, and the processor 50K forms an image in black. The processing unit 50 further includes an exposure unit 53, which emits beams to the processors 50Y, 50M, 50C, 50K, and a conveyer belt 7.

The processors 50Y, 50M, 50C, 50K are developer devices to develop toner images in a known electrophotographic method. Each of the processors 50Y, 50M, 50C, 50K includes a photosensitive body, a charger device, a developer device, and a transfer device. A surface of the photosensitive body is uniformly charged by the charger and exposed to the beams emitted from the exposure unit 53 to have a latent image corresponding to the image to be printed. Further, the latent image on the surface of the photosensitive body is supplied with toner by the developer device and developed to be a toner image.

The MFP 100 has the three sheet feeders, which are the sheet cassette 91A, the sheet cassette 91B, and the manual-feed inlet 95. The image forming unit 10 picks up the sheets stored in the sheet cassette 91A or 91B or inserted through the manual-feed inlet 95 one by one to convey on the conveyer belt 7 to the processor unit 50. Amongst the three sheet feeders, a user can designate a currently usable sheet feeder, which supplies the sheets to the processor unit 50. The currently designated feeder to supply the sheets can be designated on basis of either the MFP 100 or a print job.

The processor unit 50 fed with the sheet transfers the toner image developed in the processors 50Y, 50M, 50C, 50K to a surface of the sheet, and the sheet with the transferred image is forwarded to the fixing unit 8, in which the toner on the sheet is thermally fixed thereto. The sheet with the fixed image is conveyed further and ejected to be placed in the discharge tray 92. When a colored image is formed, toner images respectively formed by the processors 50Y, 50M, 50C, 50K are transferred to be overlaid on the surface of the sheet. When a monochrome image is formed, a toner image formed solely by the processor 50K is transferred on the surface of the sheet.

The image forming unit 10 in the present embodiment correct positions of the images in respective colors in order to avoid misalignment of the CMYK color images on the sheet and attempt to improve quality of images being formed. Correction of positions of the color images is achieved by obtaining amounts (i.e., offset values) of assumed misalignment of the color images with respect to a reference image and adjusting the positions of the color images based on the obtained offset values.

A flow to obtain the offset values is conducted when predetermined conditions are met. The flow may be activated, for example, when a number of sheets having been printed after a previous obtainment of the offset values exceeds a predetermined number. For another example, the flow may be activated when the MFP 100 is powered on for a predetermined time period. With frequently obtained offset values, the color images, of which positions are more accurately corrected, are provided. Meanwhile, a flow to adjust the positions of the color images is conducted each time the color images are formed in the image forming unit 10.

The offset values can be obtained, for example, in a following flow. That is, firstly, each of the processors 50Y, 50M, 50C, 50K forms a toner image of a register pattern being a positional index. Secondly, the register patterns are respectively transferred onto the surface of the conveyer belt 7. Thus, a reference register pattern in a predetermined reference color (one of the CMYK colors) and register patterns in other colors (other than the reference color) are formed. In this regard, the positions of the four register patterns may not always coincide with one another due to, for example, misalignment of the components in a subsidiary direction and/or out-of-synchronization of the components. Thirdly, a mark sensor 61 detects the positions of the four register patterns. Fourthly, distances between the reference register pattern and the other register patterns are calculated. Thus, the amounts of assumed misalignment of the color images with respect to the reference image (i.e., the offset values) can be obtained.

The offset values may not necessarily be obtained in the above flow. Further, the offset values may be calculated additionally in consideration of misalignment in a main scanning direction. For another example, in order to further improve quality of images being formed, a flow to correct difference of densities in respective colors can be employed.

Electrical Configuration of the MFP

Figure 3:
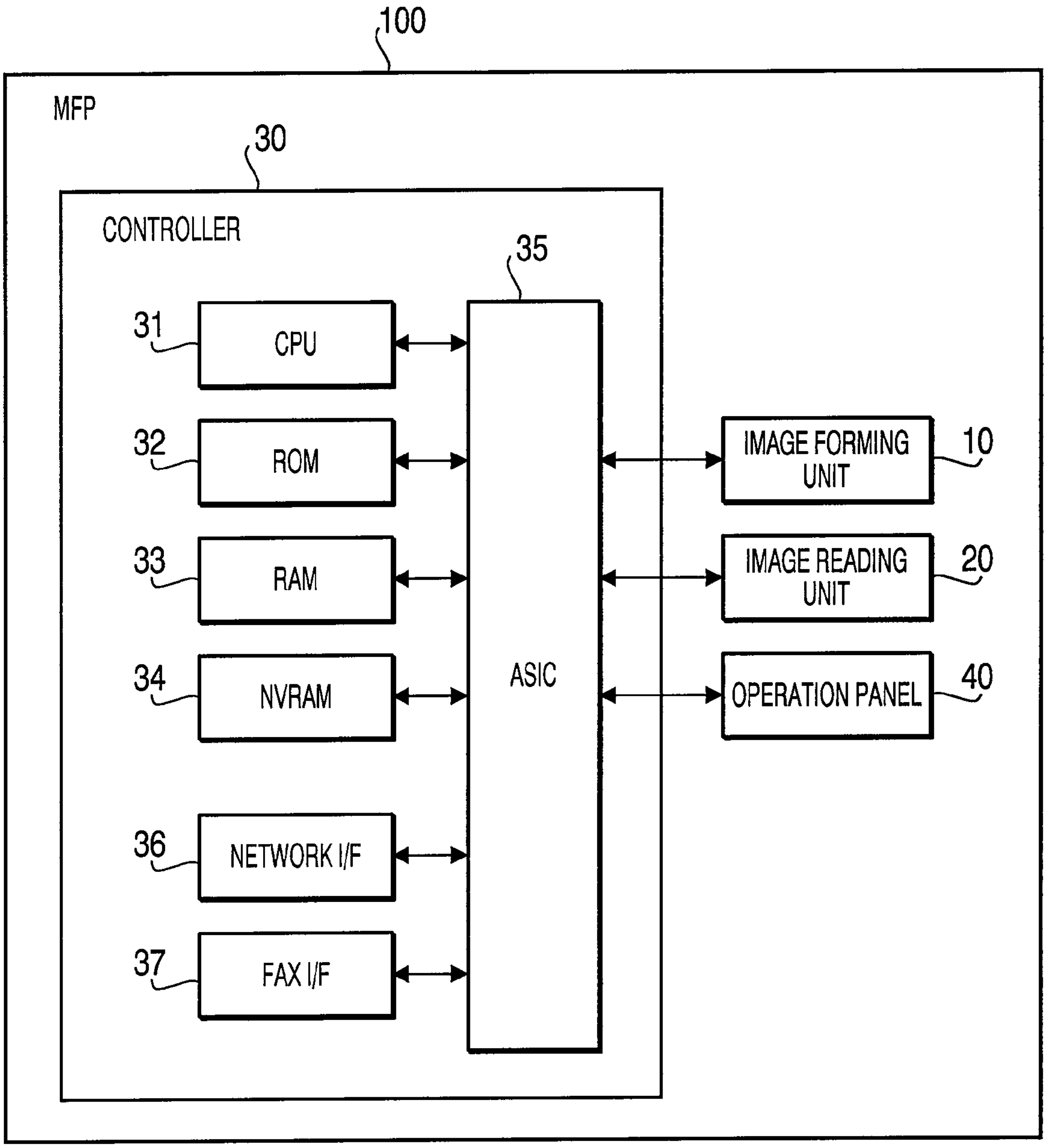
FIG. 3 is a block diagram to illustrate an electrical configuration of the MFP according to the embodiment of the present invention.

The electrical configuration of the MFP 100 will be described (see FIG. 3). The MFP 100 is provided with a controller unit 30, which includes a CPU 31, a ROM 32, a RAM 33, a non-volatile RAM (NVRAM) 34, an ASIC 35, a network interface (I/F) 36, and a FAX I/F 37. The controller unit 30 is electrically connected with the image forming unit 10, the image reading unit 20, and the operation panel 40.

The CPU 31 is an arithmetic processor, which processes information to be used to achieve functionalities of the MFP 100 including image reading, image forming, and trial printing. The ROM 32 stores programs to control the MFP 100 and information concerning operation settings and initial settings of the MFP 100. The RAM 33 serves as a work area, in which the controlling programs are developed, and a memory area, in which image data is temporarily stored. The NVRAM 34 is a data storage, in which information concerning operation settings and image data can be stored.

The CPU 31 controls behaviors of the MFP 100 through the ASIC 35. In particular, the CPU 31 processes information from the controlling programs and signals obtained from various sensors and stores the information in the RAM 33 and the NVRAM 34 to drive components in the MFP 100. The CPU 31 controls, for example, timing for emitting light from the exposure unit 53, activation of a driving motor (not shown) to drive the rollers in the feeding paths 11, 12, and a driving motor (not shown) to move an image sensor unit (not shown) in the image reading unit 20.

The network I/F 36 connects the MFP 100 with networks, such as the Internet, to establish communication with other information processing apparatuses (e.g., personal computer) through the network. The FAX I/F 37 connects the MFP 100 with a telephone line to establish communication with other facsimile machines through the telephone line.

Printing Operation

Behaviors of the MFP 100 in a printing operation will be described. The printing operation in the MFP 100 includes three printing processes, which are trial printing, main printing, and non-trial printing. The three processes are selectively executed by the MFP 100 in a print controlling flow. The print controlling flow includes at least two procedures, one of which includes the trial printing process and the main printing process following the trial printing process, and the other of which includes the non-trial printing process. The print controlling flow will be described later in detail.

As has been mentioned above, the MFP 100 has the three sheet feeders, which are the sheet cassette 91A, the sheet cassette 91B, and the manual-feed inlet 95. One of the three sheet feeders is designated as a currently usable sheet feeder, from which the sheets can be supplied to the processor unit 50. Meanwhile, a print job may designate a specific sheet feeder to supply the sheets amongst the three sheet feeders. That is, the specific sheet feeder is designated as the currently usable sheet feeder. The specific sheet feeder is registered with the MFP 100 prior to start the printing operation. The specific sheet feeder may be fixed to one of the three sheet feeders or switched from one to another amongst the three sheet feeders according to the user's preference.

The MFP 100 is equipped with a trial printing function, which is activated in the trial printing process. In the trial printing process when a print job designates a specific sheet feeder, an image in a part of the print job or images in the entire print job are preliminarily printed on sheets supplied from a sheet feeder, which is different from the specific sheet feeder.

A main printing process follows the preliminary trial printing. The MFP 100 may ask the user as to whether the user wishes the MFP 100 to proceed to the main printing process, in which the MFP 100 prints the same image of the print job once again, but this time on a sheet supplied from the specific sheet feeder designated as the currently usable sheet feeder.

The trial printing function of the MFP 100 can be selectively activated and inactivated on basis of the print job. When the trial printing function is not activated, the MFP 100 conducts a non-trial printing process. Therefore, the trial printing process, and accordingly, the main printing process are omitted. Instead, the image of the print job is printed on the sheet supplied from either the currently designated sheet feeder or an automatically selected sheet feeder, which is different from the specific sheet feeder. The non-trial printing operation is also conducted when the print job does not designate a specific sheet feeder.

Print Controlling Flow

First Example

Figure 4:
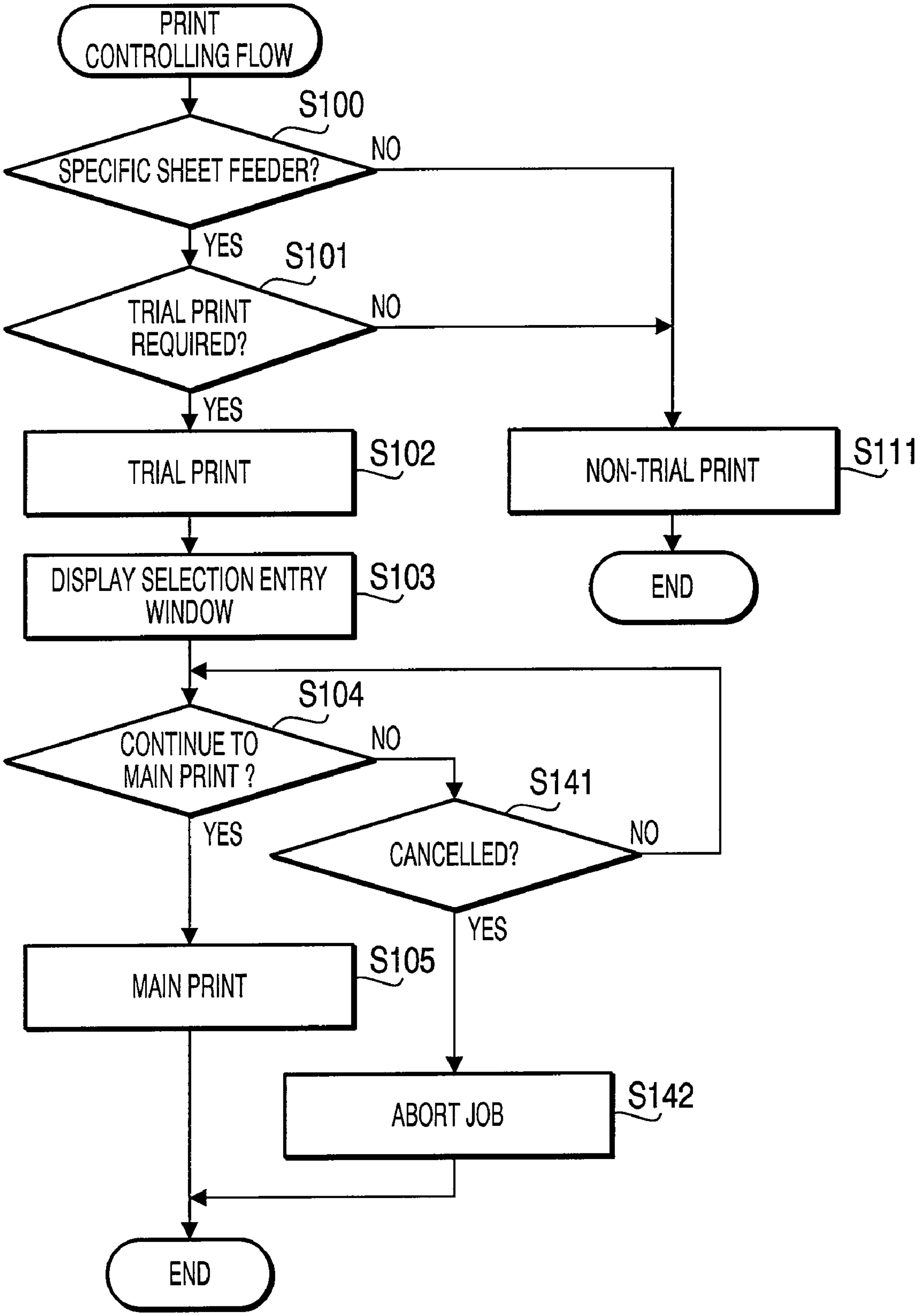
FIG. 4 is a first example of a print-controlling flow of the MFP according to the embodiment of the present invention.

A first example of a print controlling flow to control the above-described behaviors of the MFP 100 will be described with reference to FIG. 4. The print controlling flow is activated when a print job which requires printing, such as copying, is entered. The print job includes image data and is stored in, for example, the RAM 33.

In S100, the MFP 100 judges as to whether the print job designates a specific sheet feeder. If no specific sheet feeder is designated (S100: NO), in S111, the MFP 100 conducts a procedure including non-trial printing. That is, an image is printed on a sheet supplied from either the currently designated sheet feeder or a non-specific automatically selected sheet feeder. The print controlling flow ends thereafter.

In S100, if the print job designates a specific sheet feeder (S100: YES), in S101, the MFP 100 judges as to whether the print job requires trial printing. In the present embodiment, necessity of trial printing is indicated in the print job itself.

If the print job does not require trial printing (S101: NO), in S111, the MFP 100 conducts the procedure including non-trial printing. That is, an image is printed on a sheet supplied from the currently designated sheet feeder being the specific sheet feeder. The print controlling flow ends thereafter.

In S101, if the print job requires trial printing (S101: YES), in S102, the MFP 100 conducts a procedure including trial printing. That is, an image is printed on a sheet supplied from a non-designated sheet feeder, which is different from the currently designated sheet feeder. The non-designated sheet feeder may be, for example, a sheet feeder particularly registered for trial printing. When no particular sheet feeder is registered for trial printing, the printer 100 may search for a sheet feeder storing suitable-sized sheets for the print job and assigns a detected sheet feeder with suitable-sized sheets as the non-designated sheet feeder. Alternatively, for example, the MFP 100 may ask the user's preference for the trial printing.

Figure 5:
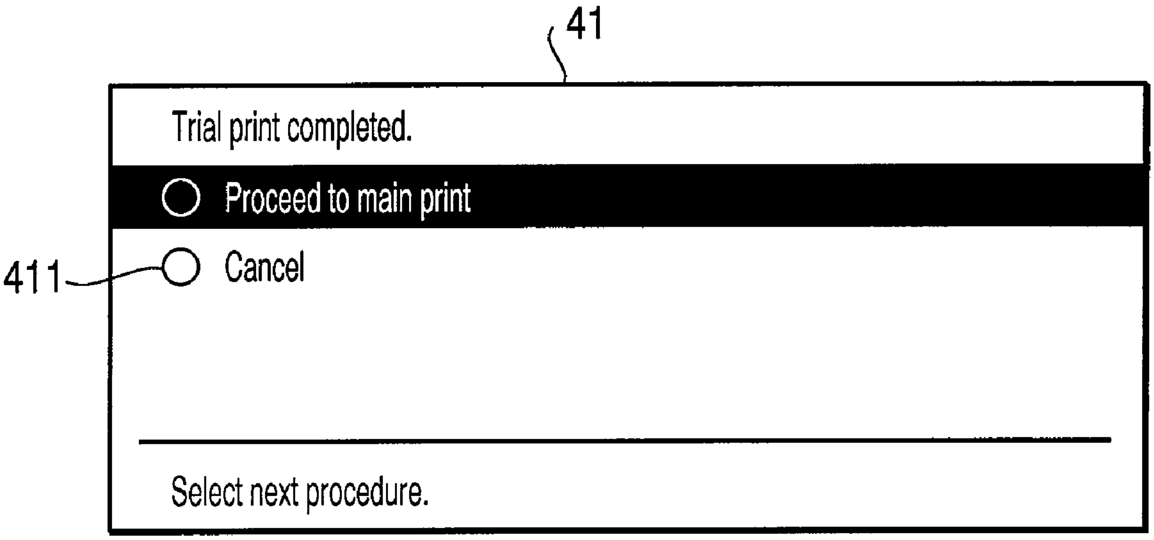
FIG. 5 is an illustrative view of a selection entry window to be displayed in the print-controlling flow according to the embodiment of the present invention.

Following completion of the trial printing, in S103, the MFP 100 displays a selection entry window (see FIG. 5), through which the user's instruction can be entered, on the display unit 41 in the operation panel 40. In the present embodiment, the selection entry window presents two options: continuing the printing procedure to main printing and cancelling the printing procedure. The user can select one of radio buttons 411 which represents the user's preference.

In S104, the MFP 100 judges as to whether the user's instruction to continue the printing procedure is received. When no instruction to continue the printing procedure is received (S104: NO), in S141, the MFP 100 judges as to whether the user's instruction to cancel the print job is received. In S141, when no instruction for cancellation is received (S141: NO), the MFP 100 returns to S104.

In S104, when the instruction to continue the printing procedure is received (S104: YES), the MFP 100 proceeds to main printing, in which the image is printed on a sheet supplied from the specific sheet feeder. In this regard, the image printed in the main printing process is identical to the image printed in the trial printing process in S102. The image data may be retransmitted for the main printing from, for example, the image reading unit 20 or an external device (e.g., a PC) connected to the MFP 100. Optionally, the image data may be obtained from a buffer memory (not shown) in the image forming unit 10. After the main printing process, the MFP 100 ends the print controlling flow.

In S141, when the instruction for cancellation is received (S141: YES), the MFP 100 aborts the print job and terminates the print controlling flow. Optionally, if no instruction is received for a predetermined period of time, the MFP 100 may forcibly abort the print job.

According to the above print controlling flow, when a print job designating the sheet cassette 91A and requiring trial printing is entered, for example, the MFP 100 prints an image on a sheet supplied from one of the sheet cassette 91B and the manual-feed inlet 95 in the trial printing process. When the trial printing completes, the user is offered an opportunity to preview the trial image printed on the sheet supplied from the sheet feeder which is different from the currently designated sheet feeder. The user may note incomplete condition or troubles occurring in the MFP 100. For example, when the processors 50Y, 50M, 50C, 50K are running out of toner, the printed image may undesirably appear unclear. Further, for another example, environmental conditions (e.g., temperature and humidity) surrounding the MFP 100 may affect quality of the printed image. Thus, when the user notes such problems occurring in the MFP 100, the user may settle the problems in this opportunity to improve the conditions before the MFP 100 prints the image on the sheet of a specific type supplied from the specific sheet feeder. In this regard, if the non-designated sheet feeder (e.g., the sheet cassette 91B or the manual-feed inlet 95) accommodates sheets, of which sheet type is different from the specific-typed sheets, the trial image can be printed on the different-typed sheets. Therefore, printing the image on the specific-typed sheets under the undesirable condition and printing the trial image on the specific-typed sheets can be avoided. In other words, printing the image of undesired quality on the specific-typed sheet inconsiderately can be moderated.

According to the embodiment, for example, unused sheets may be set in the currently designated sheet feeder as the specific-typed sheets. Meanwhile, one-side-occupied sheets, which have images printed on one side only, and the other side of which remains unused, may be set in another sheet feeder different from the currently designated sheet feeder. When the print job designates the specific-typed sheets and requires trial printing, the trial image can be printed on the one-side occupied sheets. Thus, printing the image, which may be wasted, on the specific-typed sheets can be avoided. Specifically, when the specific-typed sheets are higher-cost fine-quality sheets and the different-typed sheets are lower-cost sheets, the wasteful image printing on the higher-cost sheets can be effectively omitted.

Further, according to the embodiment, when no specific sheet feeder is designated, the MFP 100 prints the image on the sheet supplied from the designated sheet feeder without trial printing. Thus, the sheet feeders can be designated on basis of necessity of the trial printing.

Print Controlling Flow

Second Example

Figure 6:
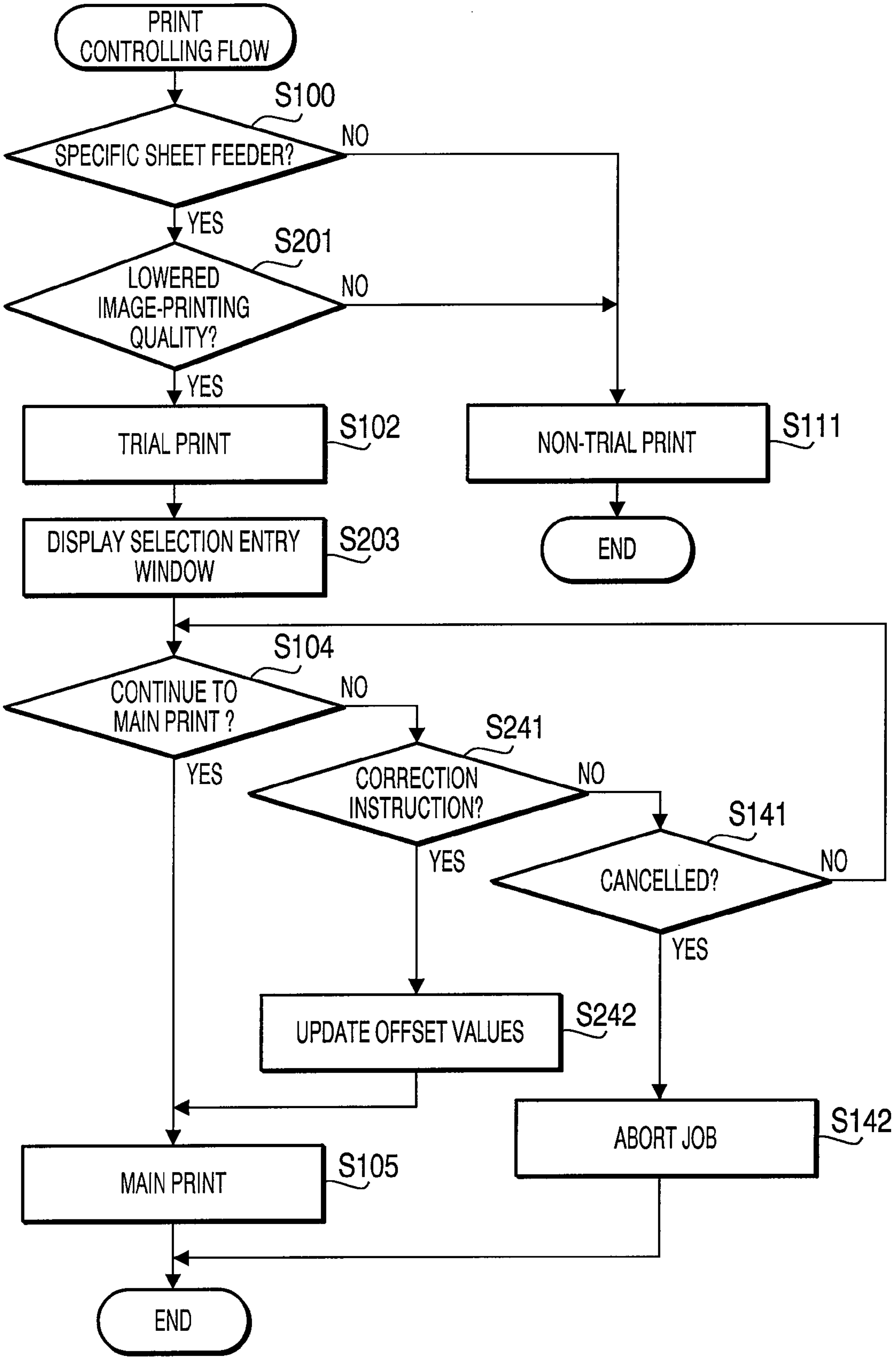
FIG. 6 is a second example of the print-controlling flow of the MFP according to the embodiment of the present invention.

Next, a second example of the print controlling flow to control the behaviors of the MFP 100 will be described with reference to FIG. 6. The print controlling flow in the second example differs from the first example in that the trial printing process is conducted when lowered image-printing quality is predicted. The remaining behaviors of the MFP 100 in the print controlling flow in the second example are equivalent to the first example. Therefore, the equivalent behaviors are referred to as the same reference step numbers, and description of those will be omitted.

Following the negative judgment in S100 (S100: NO), the flow proceeds to S111. Following the affirmative judgment in S100 (S100: YES), the flow proceeds to S201. In S201, the MFP 100 judges as to whether the MFP 100 itself is under condition of lowered image-printing quality. In the present embodiment, the MFP 100 judges that the condition of lowered image-printing quality is met if the offset values to correct misalignment of the CMYK color images have not been obtained for a predetermined period of time and when it is shortly before the offset values are obtained. For example, if the MFP 100 is configured to obtain the offset values based on the power-on time period, the MFP 100 may determine that the MFP 100 is under the condition of lowered image-printing quality when the point of judgment in S201 is between a point, which is 10 minute prior to a next assumed obtainment of the offset values, and a point of the next assumed obtainment. For another example, if the MFP 100 is configured to obtain the offset values when the amount of sheets used in the MFP 100 counts up to a predetermined threshold number, the MFP 100 may determine that the MFP 100 is under the condition of lowered image-printing quality when the amount of used sheets is between one hundred (100) smaller than the threshold number and the threshold number.

If the MFP 100 is not under the condition of lowered image-printing quality (S201: NO), in S111, the MFP 100 conducts the non-trial process and terminates the flow. If the MFP 100 is under the condition of lowered image-printing quality (S201: YES), in S102, the MFP 100 conducts the trial printing process.

Figure 7:
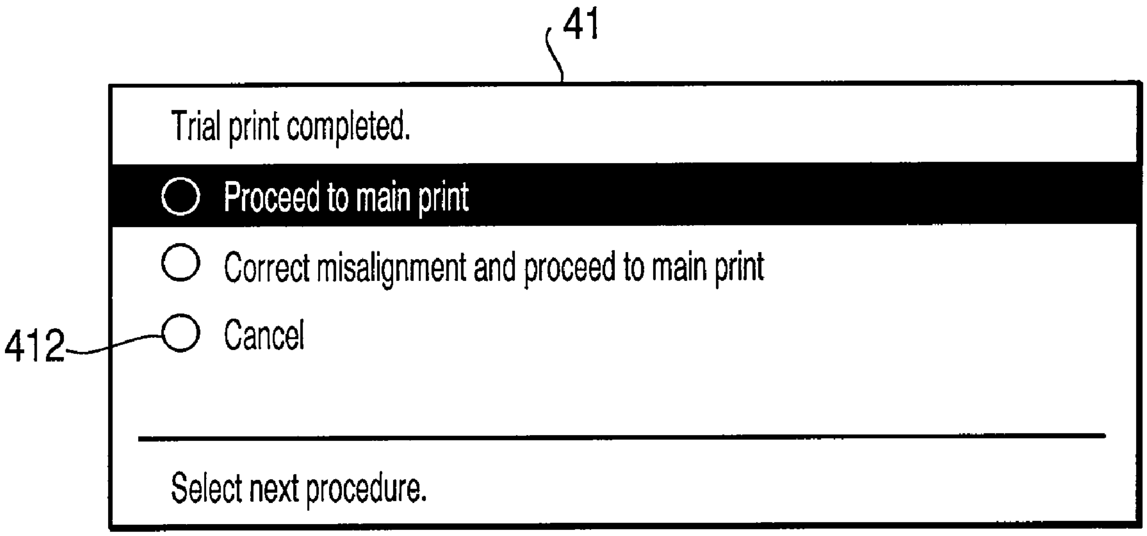
FIG. 7 is an illustrative view of a selection entry window to be displayed in the print-controlling flow according to the embodiment of the present invention.

Following S102, in S203, the MFP 100 displays a selection entry window (see FIG. 7), through which the user's instruction can be entered, on the display unit 41 in the operation panel 40. In the present embodiment, the selection entry window presents three options, two of which are continuing the printing procedure to main printing and cancelling the print job. These two options are identical to the options presented in S103 in the print controlling flow in the first example. Further, in the present example, a third option, which is attempting to improve the condition of lowered image-printing quality and continuing the printing procedure to main printing, is presented. When the third option is selected, the offset values for correcting the misalignment of the color images are obtained to be updated. The user can select one of radio buttons 411 which represents the user's preference.

In S104, the MFP 100 judges as to whether the user's instruction to continue the printing procedure and proceed to main printing is received. When no instruction to continue the printing procedure is received (S104: NO), in 241, the MFP 100 judges as to whether the user's instruction to correct the misalignment and continue to main printing is received. If the instruction to correct the misalignment and continue to main printing is not received (S241: NO), in S141, the MFP 100 judges as to whether the user's instruction to cancel the print job is received. In S141, when no instruction for cancellation is received (S141: NO), the MFP 100 returns to S104.

In S104, when the instruction to continue the printing procedure and proceed to main printing is received (S104: YES), the MFP 100 conducts main printing, in which the image is printed on a sheet supplied from the specific sheet feeder. In this regard, it is assumed that the user approves the current image-printing quality of the MFP 100. Therefore, the MFP 100 conducts the main printing process without updating the offset values.

In S241, if the instruction to correct the misalignment and proceed to main printing is received (S241: YES), in S242, the MFP 100 updates the offset values to improve the condition of lowered image-printing quality. In particular, the MFP 100 forms the register patterns on the conveyer belt 7 and obtains new offset values. With the updated offset values, in S105, the MFP 100 conducts the main printing process. Thus, the offset values are obtained prior to the main printing process. Accordingly, image printing in improved quality is expected.

In S141, when the instruction for cancellation is received (S141: YES), the MFP 100 aborts the print job and terminates the print controlling flow. Optionally, if no instruction is received for a predetermined period of time, the MFP 100 may forcibly abort the print job.

In the above print controlling flow, the condition of lowered image-printing quality is judged on basis of obtainment of the offset values for correction of misalignment. However, the judgment may be made on basis of other correction values. Alternatively or additionally, for example, the judgment may be made on basis of obtainment of offset values for correction of difference in color densities. For another example, the judgment may be made on basis of amounts of toner remaining in the processors 50Y, 50M, 50C, 50K. When the remaining amounts of toner are less than a predetermined level, the MFP 100 may conduct the trial printing process.

When the MFP 100 conducts the trial printing process on basis of the remaining amounts of toner in the processors 50Y, 50M, 50C, 50K, the print controlling flow may include a step to present an option, which suggests modifying developing biases of the processors 50Y, 50M, 50C, 50K to increase electrical potential differences between the photosensitive bodies and the developer rollers and compensate the insufficient toner and continuing to main printing thereafter, in addition to the options presented in the selection entry window in S203. For another example, if the MFP 100 conducts the trial printing process on basis of the remaining amounts of toner in the processors 50Y, 50M, 50C, 50K, the MFP 100 may proceed to the main printing step after toner cartridges in the processors 50Y, 50M, 50C, 50K are replaced with new ones. In this configuration, the toner cartridges to be replaced may be identified by unique ID numbers in order for the MFP 100 to recognize completion of replacement of the toner cartridges. The flow may proceed to the main printing step upon completion of the replacement.

In the second example of the print controlling flow, the main printing process (S105) follows the settlement of the conditions in S242. However, in the print controlling flow, the settlement of the conditions may not necessarily be followed by the main printing process. For example, after settlement of the conditions, the flow may repeat the trial printing process once again. Thus, the user is offered an opportunity to preview the image printed under the updated condition. The flow may proceed to the main printing process after the user's approval of the updated condition.

According to the second example of the print controlling flow, the MFP 100 conducts the trial printing process when the print job designating a specific sheet feeder is processed under the condition of lowered image-printing quality. In this regard, the user may not find the image printed under the condition of lowered image-printing quality to be acceptable. Therefore, under such condition, the MFP 100 conducts the trial printing process to provide the user with the opportunity to preview the image.

As has been described, the MFP 100 can print the image preliminarily on a sheet supplied from a sheet feeder which is different from a currently designated sheet feeder, whilst a specific sheet supplied from the currently designated sheet feeder is used in the main printing process. Therefore, wasteful use of the specific sheet can be avoided. For example, the user may designate the sheet cassette 91A as the currently usable sheet feeder and set specific-typed sheets in the sheet cassette 91A. Further, the user may set non-specific different-typed sheets in the sheet cassette 91B. When the MFP 100 conducts the trial printing process with the sheet cassette 91B, the image is printed on the different-typed sheet, and the user is allowed to preview the trial image and determine the image-printing quality of the MFP 100. Thereafter, the MFP 100 waits for a further instruction. If the user approves the image-printing quality, the user may instruct the MFP 100 to proceed to the main printing process. Accordingly, the MFP 100 prints the image on the specific-typed sheet supplied from the designated sheet feeder. In other words, the main printing process is not conducted when the user does not approve the image-printing quality of the trial image. Therefore, printing the image on the specific-typed sheets under the undesirable condition and printing the trial image on the specific-typed sheets can be avoided. Thus, printing the image of undesired quality on the specific-typed sheet inconsiderately can be moderated.

Although examples of carrying out the invention have been described, those skilled in the art will appreciate that there are numerous variations and permutations of the printer that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the present invention can be similarly effectively applied to other image forming apparatuses having a plurality of sheet feeders, such as a printer and a copier. Further, the image forming unit in the image forming apparatus may not necessarily form images electro-photographically, but may form in, for example, inkjets. Furthermore, the image forming apparatus may be either a multi-color image forming apparatus or a monochrome image forming apparatus.

For another example, the trial printing process may be conducted on basis of the print job setting to require trial printing (S101 in the first example) and the condition of lower image-printing quality (S201 in the second example). The trial printing process may be conducted, for example, at least one of when the print job requires trial printing and when the condition of lower image-printing quality is met. For another example, the MFP 100 may not conduct the trial printing process even if the print job requires the trial printing process but conduct the non-trial printing process when the processors 50Y, 50M, 50C, 50K have predetermined levels of remaining toners.

Furthermore, for example, the MFP 100 may conduct the trial printing process when the print job designates a specific sheet feeder regardless of the print job setting or the condition of lower image-printing quality. In this configuration, the print controlling flow is less complicated. It may be noted, however, the trial printing process results in wasteful use of sheets, even though the sheets are non-specific different-typed sheets, and toner. Therefore, when the MFP 100 is configured to conduct the trial printing process in the print controlling flow on basis of the print job setting requiring trial printing and the condition of lower image-printing quality, as it is in the above embodiment, the MFP 100 may not necessarily conduct trial printing each time a print job designating a specific sheet feeder is entered but conduct when the print job requires trial printing and/or when the condition of lower image-printing quality is met. Accordingly, the wasteful use of the non-specific sheets and toner can be reduced.

Figure 8:
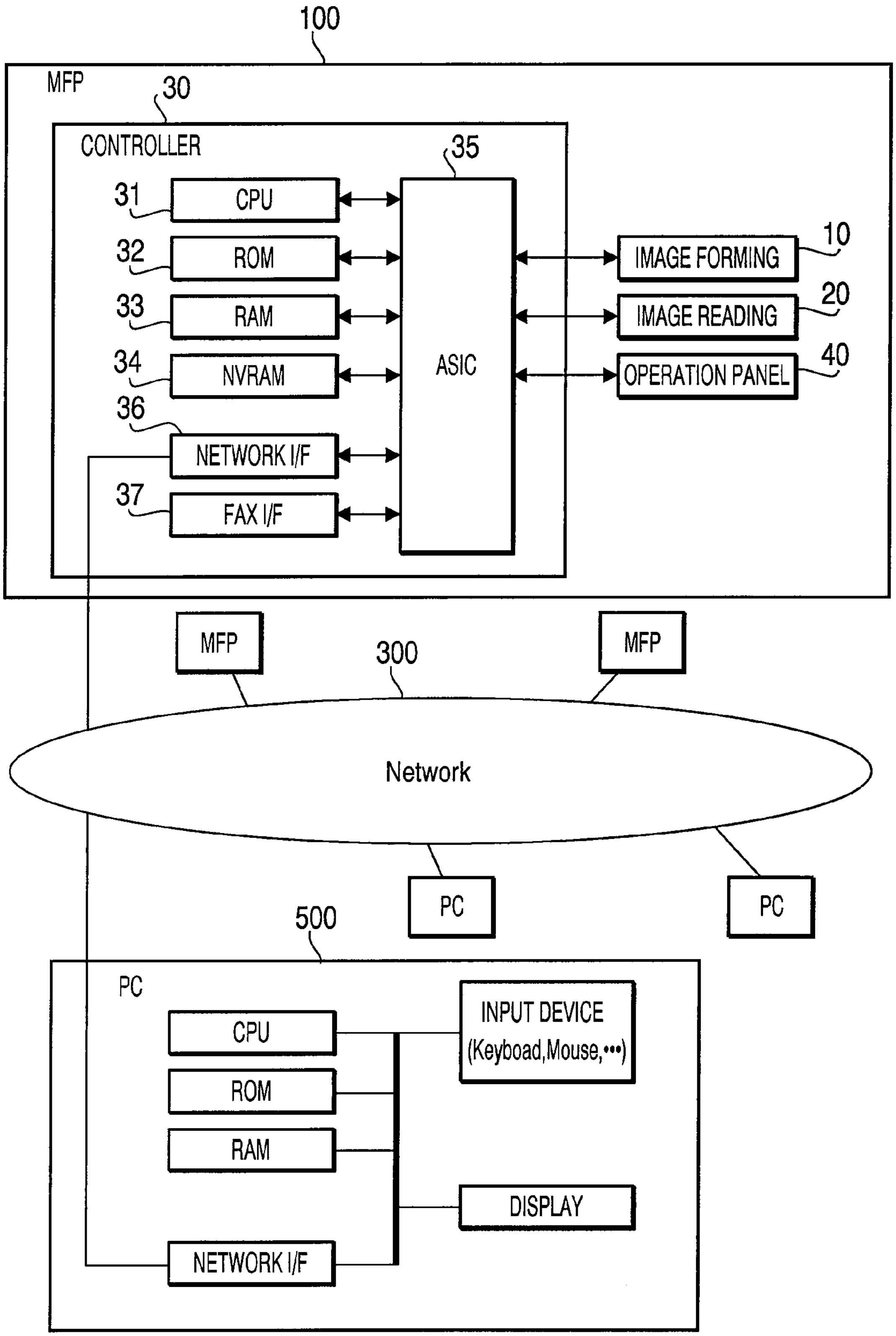
FIG. 8 is a schematic diagram to illustrate an example of a printing system according to the embodiment of the present invention.

In the above embodiment, the user's instruction to proceed to main printing is received in the MFP 100 directly. However, for example, within a printing system (see FIG. 8), in which the MFP 100 is connected with an external device (e.g., a PC 500), when a print job is transmitted from the PC 500, the user's instruction may be entered in the PC 500 and transmitted to the MFP 100. In this regard, the selection entry window 41 is displayed on a screen of the PC 500 in S103 and S203.

In the print controlling flow, the MFP 100 may print the entire pages or a part of the pages included in the print job in the trial printing process. When the entire pages are printed, the entire trial images, which are identical to the images to be printed in the main printing process, can be previewed. When a part of the pages (e.g., a first page only) is printed in the trial printing process, on the other hand, the images printed in the main printing process are partially in common with the part of the pages printed in the trial printing process. In this regard, wasteful use of the sheets and toner can be moderated.

Further, two or more sheet feeders may be designated as the currently usable sheet feeders. For example, the sheet cassettes 91A, 91B may be designated as the currently usable sheet feeders adaptable for non-trial printing, whilst the manual-feed inlet 95 should supply the sheet in the trial printing process. Thus, the present invention is applicable to an image forming apparatus having two or more sheet feeders, at least one of which can serve as the currently usable sheet feeder and another of which can serve as a different sheet feeder.

What is claimed is:

1. A printing apparatus, comprising:

an image forming unit to form an image on a sheet in a colorant;

a first sheet feeder and a second sheet feeder to supply sheets to the image forming unit;

a trial printing system, which conducts a trial printing process to print at least a part of images included in a print job on a sheet supplied from the second sheet feeder when the print job designates the first sheet feeder;

a first receiving system, which receives an instruction to continue printing after completion of the trial printing process; and a main printing system, which conducts a main printing process to print the images included in the print job on a sheet supplied from the first sheet feeder when the first receiving system receives the instruction to continue printing.

2. The printing apparatus according to claim 1, further comprising:

a first non-trial printing system, which conducts a non-trial printing process to print the images included in the print job designating the first sheet feeder on the sheet supplied from the first sheet feeder; and a controlling system, which controls to conduct at least one of a first printing procedure, which includes the trial printing process and the main printing process following the trial printing process, and a second printing procedure, which includes the non-trial printing process, when the print job designating the first sheet feeder is entered.

3. The printing apparatus according to claim 2, wherein the controlling system conducts the first printing procedure when an amount of the colorant remaining in the image forming unit is less than a predetermined level.

4. The printing apparatus according to claim 2, wherein the controlling system conducts the first printing procedure when the printing apparatus is under a condition of lowered image-printing quality.

5. The printing apparatus according to claim 4, further comprising:

a second receiving system, which receives an instruction to conduct an improving process, the improving process attempting to improve the condition of lowered image-printing quality after completion of the trial printing process, wherein, when the second receiving system receives the instruction to conduct the improving process, the controlling system conducts the main printing process to print the images included in the print job after the improving process.

6. The printing apparatus according to claim 1, wherein the main printing system prints the images which are at least partially in common with the at least a part of the images printed by the trial printing system.

7. The printing apparatus according to claim 1, wherein the main printing system prints images identical to the at least part of the images printed by the trial printing system.

8. The printing apparatus according to claim 1, further comprising:

a second non-trial printing system, which conducts a non-trial printing process to print images included in a print job designating the second sheet feeder on the sheet supplied from the second sheet feeder.

9. A printing system, comprising:

an image forming unit to form an image on a sheet in a colorant;

a first sheet feeder and a second sheet feeder to supply sheets to the image forming unit;

a trial printing system, which conducts a trial printing process to print at least a part of images included in a print job on a sheet supplied from the second sheet feeder when the print job designates the first sheet feeder;

a receiving system, which receives an instruction to continue printing after completion of the trial printing process; and a main printing system, which conducts a main printing process to print the images included in the print job on a sheet supplied from the first sheet feeder when the receiving system receives the instruction to continue printing.

* * * * *